(12) United States Patent
Leutenegger et al.

(10) Patent No.: US 12,050,326 B2
(45) Date of Patent: Jul. 30, 2024

(54) METHOD OF AND APPARATUS FOR IMAGING LIGHT EMITTING OBJECTS ON AN IMAGE SENSOR

(71) Applicants: Max-Planck-Gesellschaft zur Foerderung der Wissenschaften e.V., Munich (DE); Katholieke Universiteit Leuven KU Leuven Research & Development, Leuven (BE)

(72) Inventors: Marcel Leutenegger, Goettingen (DE); Wim Vandenberg, Leuven (BE); Peter Dedecker, Leuven (BE); Arno Bouwens, Leuven (BE)

(73) Assignee: MAX-PLANCK-GESELLSCHAFT ZUR FÖRDERUNG DER WISSENSCHAFTEN E.V., Munich (DE)

( * ) Notice: Subject to any disclaimer, the term of this patent is extended or adjusted under 35 U.S.C. 154(b) by 499 days.

(21) Appl. No.: 17/393,690

(22) Filed: Aug. 4, 2021

(65) Prior Publication Data
US 2021/0397014 A1    Dec. 23, 2021

Related U.S. Application Data

(63) Continuation of application No. PCT/EP2020/051264, filed on Jan. 24, 2020.

(30) Foreign Application Priority Data

Feb. 4, 2019    (EP) .................................... 19155255

(51) Int. Cl.
*G01N 21/00*    (2006.01)
*G01N 21/64*    (2006.01)
(Continued)

(52) U.S. Cl.
CPC ......... *G02B 27/58* (2013.01); *G01N 21/6458* (2013.01); *G02B 5/3083* (2013.01);
(Continued)

(58) Field of Classification Search
CPC ..... G01N 21/64; G01N 33/483; G01N 33/543
See application file for complete search history.

(56) References Cited

U.S. PATENT DOCUMENTS 7,633,053 B2    12/2009    Wolleschensky et al.
8,693,742 B2    4/2014    Piestun et al.
(Continued)

FOREIGN PATENT DOCUMENTS

DE    102014111167 A1    2/2016
EP    0483827 A2    5/1992
(Continued)

OTHER PUBLICATIONS

S. Geissbuehler et al.: "Live-cell multiplane three-dimensional super-resolution optical fluctuation imaging", Nature Communications, DOI: 10.1038/ncomms6830, 2014.
(Continued)

*Primary Examiner* — Dani Fox
(74) *Attorney, Agent, or Firm* — Thomas | Horstemeyer, LLP (57) ABSTRACT

An optical module for imaging light emitting objects on an image sensor comprises a polarizing beam splitter having an entrance face, an exit face, first and a second return faces, a first reflector facing the first return face, a first achromatic quarter-wave retardation plate between the first return face and the first reflector, a second reflector facing the second return face, and a second achromatic quarter-wave retardation plate between the second return face and the second reflector. The first and second reflectors differ in at least one of their orientation with regard to the first and second return (Continued)

faces or their spectral properties. At least one of the first reflector and the second reflector comprises a dichroic mirror arranged between the respective achromatic quarter-wave retardation plate and a further mirror of the respective reflector. The dichroic mirror is tilted with regard to the further mirror of the respective reflector.

24 Claims, 8 Drawing Sheets

(51) Int. Cl.
    *G02B 5/30*     (2006.01)
    *G02B 21/00*     (2006.01)
    *G02B 21/16*     (2006.01)
    *G02B 21/36*     (2006.01)
    *G02B 26/08*     (2006.01)
    *G02B 27/28*     (2006.01)
    *G02B 27/58*     (2006.01)

(52) U.S. Cl.
    CPC ......... *G02B 21/0076* (2013.01); *G02B 21/16* (2013.01); *G02B 21/365* (2013.01); *G02B 26/0891* (2013.01); *G02B 27/283* (2013.01)

(56) References Cited

U.S. PATENT DOCUMENTS

| | | | |
|---|---|---|---|
| 8,982,463 B2 | 3/2015 | Ouderkirk | |
| 9,658,422 B2 | 5/2017 | Gimblet et al. | |
| 9,881,355 B2 | 1/2018 | Piestun et al. | |
| 2003/0230710 A1* | 12/2003 | Wolleschensky | G02B 26/06 |
| | | | 250/234 |
| 2017/0227749 A1 | 8/2017 | Kleppe et al. | |

FOREIGN PATENT DOCUMENTS

| | | |
|---|---|---|
| EP | 1372011 A2 | 12/2003 |
| EP | 2438555 A1 | 4/2012 |
| JP | H 11-035133 A | 11/1999 |
| WO | 200807083 | 12/1899 |
| WO | 2006127692 A2 | 11/2006 |
| WO | 2012/039895 A1 | 3/2012 |
| WO | 2017027818 A1 | 2/2017 |
| WO | 2018085531 A2 | 5/2018 |
| WO | 2018134730 A1 | 7/2018 |

OTHER PUBLICATIONS

A. Descloux et al.: "Combined multi-plane face retrieval and super-resolution optical fluctuation imaging for 4D cell microscopy", Nature Photonics, vol. 12, Mar. 2018, 165-172.

T. Dertinger et al.: "Achieving increased resolution and more pixels with Superresolution Optical Fluctuation Imaging (SOFI)", Optics Express vol. 18, No. 18 (pp. 18875-18885), Aug. 2010.

European Office Action in co-pending, related EP Application No. 20700911.9, mailed Jun. 5, 2023.

* cited by examiner

METHOD OF AND APPARATUS FOR IMAGING LIGHT EMITTING OBJECTS ON AN IMAGE SENSOR

CROSS REFERENCE TO RELATED APPLICATIONS

This application is a continuation to international patent application PCT/EP2020/051264 entitled "Method of and apparatus for imaging light emitting objects on an image sensor", filed on Jan. 24, 2020, and claiming priority to European patent application No. 19 155 255.3 also entitled "Method of and apparatus for imaging light emitting objects on an image sensor" and filed on Feb. 4, 2019.

FIELD OF THE INVENTION

The present invention relates to the field of super-resolution optical microscopy.

More particularly, the present invention relates to an optical module for imaging light emitting objects on an image sensor according to such a method, to a parallelized confocal, RESOLFT or STED scanning light microscope including such an optical module, and to a use of such an optical module.

Further, the present invention relates to a method of imaging light emitting objects on an image sensor of a widefield microscope, wherein a first partial beam and a second partial beam are split off light coming from the objects, and wherein on the same image sensor, at the same magnification, and in the same orientation, a first image and a second image of the object are simultaneously formed of the first partial beam and of the second partial beam, respectively, the first image and the second image being arranged on the image sensor at a first lateral offset.

FUNDING

The project leading to this application has received funding from the European Research Counsil (ERC) under the European Union's Horizon 2020 research and innovation program (grant agreement No. 714688).

BACKGROUND

Super-resolution optical microscopy overcomes the diffraction limit, which limits the spatial resolution of standard optical microscopy, by encoding the spatial information on the location of fluorescent objects in a sample in a temporary fluctuation of the fluorescence emission state of the sample. Single molecule localization microscopy (SMLM) exploits long-living dark and bright fluorescent states of the objects to sequentially image stochastic sparse subsets of the objects such that the diffraction-limited images of the individual fluorescing objects in the subsets do not overlap. Thus, the individual fluorescing objects may be localized precisely based on the shape of their point spread function (PSF). SMLM is described, for example, in WO 2006/127692 A2.

Super-resolution optical fluctuation imaging (SOFI) analyzes an image series of stochastically blinking fluorescent objects by calculating spatial-temporal cumulants of the fluorescence intensity fluctuations, see for example EP 2 438 555 B1. Whereas SMLM achieves precise localizations of fluorescing objects if the condition of sparse subsets of the fluorescent objects and distinct image spots of the individual fluorescing objects is fulfilled, SOFI improves the spatial resolution less but allows for a large degree of overlap of the image spots of the blinking fluorescent objects.

In addition to the lateral position, SMLM can be adapted to retrieve further information on the individual fluorophores. For this purpose, the lateral PSF has been engineered to change significantly with respect to the emission wavelength, see WO 2017/027818 A1. Further, the lateral PSF has been engineered to change significantly with the emission polarization and/or the axial position of the respective fluorophore, see U.S. Pat. No. 8,693,742 B2 and U.S. Pat. No. 9,881,355 B2. As the modified PSFs are significantly larger, however, the sparsity condition for unambiguous intensity distribution and retrieval of the information becomes much stricter, putting severe constraints on the blinking behavior of the imaged fluorophores and/or their absolute density in the sample.

Owing to the correlation analysis, SOFI does not and does not need to attribute the intensities measured in individual images or subsets of individual images to individual fluorophores. Thus, SOFI enables the retrieval of information on the emission color, the emission polarization and/or the axial position of stochastically blinking fluorophores whose lateral PSFs encoding said information largely overlap. Intensity fluctuations with a specific PSF can be detected by cross-cumulating the intensities measured by sensor pixels matched to said PSF shape. The matched cross-cumulant strongly responds to intensity fluctuations with its specific PSF shape but is insensitive to fluctuations with other PSF shapes.

S. Geissbuehler et al.: "Live-cell multiplane three-dimensional super-resolution optical fluctuation imaging", Nature Communications, DOI: 10.1038/ncomms6830, 2014 disclose three-dimensional (3D) SOFI using a multiplexed image scheme for simultaneous acquisition of multiple focal planes. 3D-cross-cumulants are used for depth sampling. In a multiplane wide-field fluorescence microscope, the multiple focal planes are simultaneously imaged on two cameras. The focal planes are obtained by splitting the fluorescence light coming from a sample into several channels using three 50:50 beams splitter cubes, and by introducing path length differences with mirrors and one of the two cameras. The images of the focal planes are arranged side-by-side on the cameras. A field stop in the intermediate image prevents overlaps between the image frames.

According to A. Descloux et al.: "Combined multi-plane face retrieval and super-resolution optical fluctuation imaging for 4D cell microscopy", Nature Photonics, Vol. 12, March 2018, 165-172 a phase retrieval instrument with super-resolution microscopy (PRESM) comprising a customized prism is used for simultaneous acquisition of eight single images at eight different z-locations. Four of the eight images are each arranged on one of two cameras in a non-overlapping side-by-side fashion.

DE 10 2014 111 167 A1 and US 2017/0227749 A1 belonging to the same patent family disclose a microscopy high-resolution scanning method and a high-resolution scanning microscope. The method includes imaging a diffraction-limited illumination spot in a sample on a spatially resolving two-dimensional detector having a spatial resolution which resolves a diffraction structure of the diffraction image. For the purpose of discriminating between predetermined wavelength ranges in fluorescence radiation of the sample, a number of Airy disks are generated on the two-dimensional detector by means of a spectrally selective element. The number of the Airy disks corresponds to the number of the predetermined wavelength ranges. The Airy disks are offset laterally from one another such that the diffraction image consists of the mutually offset Airy disks. The Airy disks lie completely on the two-dimensional detector, and they overlap but do not cover each other completely. The spectrally selective element comprises a grating, a prism, a wedge plate and/or a doublet lens. The spectrally selective element only influences the imaging but not the illumination of the sample.

WO 2018/134730 A1 discloses a microscopy method and apparatus for determining the positions of an isolated emitter object in a three-dimensional space. An optical beam of light emitted by the emitter object and passing through an objective lens is split in a first and a second secondary beam. The first and second secondary beam are directed through a varifocal lens such that the first secondary beam impinges on the varifocal lens on an optical axis of the varifocal lens and the second secondary beam impinges decentralized on the varifocal lens at an offset to the optical axis and along a direction parallel to the same. A focal length of the varifocal lens is controlled electronically such as to move the respective focal positions of the first and second secondary beam along said optical axis in a predetermined travel time. A first and a second image of the emitter object are simultaneously acquired in an integration time greater than or equal to the travel time of the focal positions simultaneously detecting the first secondary beam in-axis and the decentralized second secondary beam in respective first and second detection areas in an image plane. By analyzing the first and second images for determining a first object position in the first image, a second object position in the second image, and a relative displacement of the two positions of the object, an axial position of the emitter object along an axis perpendicular to the image plane is determined. The primary optical beam is split in the first and secondary optical beams by a beam splitter, and the first and second secondary beams are then re-directed such that they propagate along two distinct and mutually parallel directions. The known method and apparatus may be used for 3D tracking of the isolated emitter object.

EP 0 483 827 A2 discloses an apparatus for and a method of scanning a drum inner face with two light beams. A light beam output unit combines two circularly polarized light beams having opposite handedness to each other to produce a composite light beam. A polarization beam splitter and mirrors change the course of the composite light beam towards the drum inner face. A quarter-wave plate upstream of the polarization beam splitter has the effect that the polarization beam splitter splits the composite light beam to choose separate light beams as a function of the handedness of the circularly polarized light. Each of the two separate light beams exiting the polarization beam splitter is reflected back to the polarization beam splitter by a reflector, a further quarter-wave plate being arranged between the polarization beam splitter and the respective reflector. One of the two reflectors is inclined by an inclination angle to a plane perpendicular to the optical path such that the two separate light beams deflected by the polarization beam splitter in generally the same direction are inclined with regard to each other by twice the inclination angle. Thus, the two separate light beams are focused in two separate light spots on the drum inner face. Prior to being combined, the original two circularly polarized light beams are modulated separately.

WO 2018/085531 A2 discloses a multispectral variant of SMLM in which positions and emission spectra of single fluorescent molecules located in a field of view in a widefield imaging setting are measured simultaneously. A positional image and spectral image of each fluorescent molecule in the field of view are generated, and the precise location of the fluorescent molecule and its emission spectrum can be determined by combining the two images. A beam splitter splits light coming from the fluorescent molecules into a first portion and a second portion and directs the first portion to a positional lens, and the second portion to a spectral lens. A dispersion element, e.g. a prism assembly, is positioned between the beam splitter and the spectral lens. A knife edge mirror positioned between the positional lens and the spectral lens directs the first and second portion of the light to two separate areas of a same image sensor.

There still is a need of an optical module for imaging light emitting on an image sensor and of a method of imaging light emitting objects on an image sensor of a widefield microscope which allow for retrieving even more information on the light emitting objects in SOFI and SMLM.

SUMMARY OF THE INVENTION

The present invention relates to optical module for imaging light emitting objects on an image sensor. The optical module comprises a polarizing beam splitter (PBS) having an entrance face, an exit face, a first return face and a second return face; a first reflector facing the first return face; a first achromatic quarter-wave retardation plate arranged between the first return face and the first reflector; a second reflector facing the second return face; and a second achromatic quarter-wave retardation plate arranged between the second return face and the second reflector. The first reflector and the second reflector differ in at least one of their orientation with regard to the first and second return faces or their spectral properties, wherein at least one of the first reflector and the second reflector further comprises at least one of
  at least one dichroic mirror arranged between the respective first or second achromatic quarter-wave retardation plate and a further mirror of the at least one of the first reflector and the second reflector, wherein the at least one dichroic mirror is tilted with regard to the further mirror of the at least one of the first reflector and the second reflector,
  a dispersive prism,
  a diffractive grating,
  an electro optical deflector, and
  a phase mask.

The present invention also relates to a parallelized confocal, RESOLFT or STED scanning light microscope comprising a light source; an objective; a sample holder; an image sensor; an excitation light beam path extending from the light source, through the objective and towards the sample holder, and configured to form a plurality of separate effective excitation volumes in a sample held by the sample holder; a detection light beam path extending from the sample, through the objective and up to an image sensor, and configured to image light emitted by the sample out of the separate effective excitation volumes into separate areas of the image sensor; and the optical module according of the present invention and arranged in the detection beam path.

Further, the present invention relates to a use of the optical module of the present invention in a method of imaging light emitting objects on an image sensor of a widefield fluorescence light microscope, the optical module being arranged between a microscope objective and the image sensor of the widefield fluorescence light microscope. In this use, the optical module splits a first partial beam and a second partial beam off light coming from the objects; and the optical module simultaneously forms, on the same image sensor, at a same magnification, and in a same orientation, a first image and a second image of the objects of the first partial beam and of the second partial beam, respectively, the first image and the second image being arranged on the image sensor at a first lateral offset. The first image and the second image of the objects overlap by more than 50% of their areas on the image sensor; and the first lateral offset is at least 20% of a maximum full width at half maximum (FWHM) in direction of the first lateral offset of a first point spread function (PSF) in imaging any one particular point of the objects in the first image and of a second PSF in imaging the same one particular point of the objects in the second image.

Further, the present invention relates to a method of imaging light emitting objects on an image sensor of a widefield fluorescence light microscope in which a first partial beam and a second partial beam are split off light coming from the objects; and in which, on the same image sensor, at a same magnification, and in a same orientation, a first image and a second image of the objects are simultaneously formed of the first partial beam and of the second partial beam, respectively, the first image and the second image being widefield images arranged on the image sensor at a first lateral offset. The first image and the second image of the objects overlap by more than 50% of their areas on the image sensor. The first lateral offset is in a range from a minimum percentage to a maximum percentage of a maximum full width at half maximum (FWHM) in direction of the first lateral offset of a first point spread function (PSF) in imaging any one particular point of the objects in the first image and of a second PSF in imaging the same one particular point of the objects in the second image, wherein the minimum percentage is 100%. A series of the overlapping images are recorded with the image sensor and evaluated according to super-resolution optical fluctuation imaging (SOFI).

The optical module of the invention may be arranged, and the first partial beam and the second partial beam may be split off the light coming from the objects somewhere between a microscope objective and an image sensor of the respective light microscope. More particular, the optical module of the invention may be arranged, and the first partial beam and the second partial beam may be split off the light coming from the objects in the infinity space of the respective light microscope.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components of the drawings are not necessarily to scale, emphasize instead being placed upon clearly illustrating the principles of the present invention. In the drawings, like reference numerals designate corresponding parts throughout the several views.

DETAILED DESCRIPTION

In the description of the present invention, the term "fluorophore" is used as a synonym for the term "fluorescent object".

In the method of imaging light emitting objects on an image sensor of a widefield microscope, in which a first partial beam and a second partial beam are split off light coming from the objects, and in which, on the same image sensor, at the same magnification, and in a same orientation, a first image and a second image of the objects are simultaneously formed of the first partial beam and of the second partial beam, respectively, the first image and the second image are arranged on the image sensor at a first lateral offset. This first lateral offset is so small that the first image and the second image of the objects on the image sensor essentially overlap. At least, the first image and the second image of the objects overlap by more than 50% of their areas on the image sensor. On the other hand, the first lateral offset is at least 20% of a maximum full width at half maximum (FWHM) in direction of the first lateral offset of a first point spread function (PSF) in imaging any one particular point of the objects in the first image and of a second PSF in imaging the same one particular point of the objects in the second image. This criterion ensures that the diffraction limited image spots of any one particular point of the objects in the first and second images on the image sensor do not completely overlap so that their lateral offset is recognizable. Thus, each particular point of the objects is imaged in two non-identical image spots or FWHM zones in the overlapping first and second images.

In an application of the use according to the present invention to SMLM, the minimum first lateral offset may be smaller than in an application to SOFI. Particularly, in the application to SMLM, an elliptical overlapping area of the two image spots into which one point of the objects is imaged may be sufficient to recognize the first lateral offset. Even in the application to SMLM, however, the minimum first lateral offset is at least 20% or 100% of the maximum FWHM.

The minimum first lateral offset of at least 100% of the maximum FWHM ensures that the diffraction limited image spots of any one particular point of the objects in the first and second images on the image sensor do essentially not overlap so that they are separable. Thus, each particular point of the objects is imaged in two separate image spots in the overlapping first and second images. The minimum first lateral offset of 100% of the maximum FWHM is preferred in the application of the use or the method according to the present invention to SOFI.

Owing to the correlation analysis, SOFI does not and does not need to attribute the intensities measured in individual images or subsets of individual images to individual light emitting objects. Thus, SOFI enables the retrieval of information on the emission color, the emission polarization and/or the axial position of stochastically blinking light emitting objects whose lateral PSFs encoding said information largely overlap. Intensity fluctuations with a specific PSF shape can be detected by cross-cumulating the intensities measured by sensor pixels matched to said PSF shape. The matched cross-cumulant strongly responds to intensity fluctuations with its specific PSF shape but is insensitive to fluctuations with other PSF shapes if no other PSF shape illuminates all of the matched sensor pixels. For instance, the ends of a distance used for a second-order cross-cumulant analysis of a matched double-spot PSF must not fall within any other PSF shape in this direction.

Preferably, the first lateral offset is not much larger than needed for fulfilling this purpose. Consequently, the first and second images of the light emitting objects of interest will typically nearly overlap completely. In application of the use according to the present invention to SMLM, the suitable first lateral offset will often be in a range from 50% to 100% or 200% of the maximum FWHM in direction of the first lateral offset, and in the application of the use or the method according to the present invention to SOFI, a suitable first lateral offset will often be in a range from 100% to 1000% or more particularly from 200% to 500% of the maximum FWHM in direction of the first lateral offset. This maximum FWHM refers to the maximum extent of the first and second PSFs in direction of the first lateral offset considering all possible light emitting objects and all possible positions of these light emitting objects which may have an influence on the extension of the first and second PSFs in imaging the objects on the image sensor. Even considering the largest extension of the first and second PSFs the image spots into which any one particular point of the objects is imaged will not inseparably overlap on the image sensor. The first and second images, however, do essentially overlap, and the image spots of different points of the objects may overlap in each of the first and second images.

Thus, typically, the first lateral offset will be in a range from a minimum percentage to a maximum percentage of the maximum FWHM in direction of the first lateral offset, the minimum percentage being 50%, 100% or 200% and the maximum percentage being 100%, 200% or 500% and higher than the minimum percentage.

Although the overlapping first and second images are formed at a same magnification and in a same orientation of the first and second partial beams of the light coming from the objects, the first and second images are, as a rule, not identical but used to encode additional information on the light emitting objects. For this purpose, first components of the incoming light split-off in the first partial beam and second components of the incoming light split-off in the second partial beam may differ in their wavelength ranges and/or polarization in the incoming light. Most preferably, however, the light coming from any of the light emitting objects will not only be imaged in an image spot in either the first image or the second image. Instead, each object is preferably imaged in image spots in both the first and second images, and a lateral offset of these image spots and/or an orientation of the lateral offset will depend on the properties of the respective light emitting object and will thus encode these properties.

In a more particular embodiment of the method according to the present invention, at least one of the first partial beam and the second partial beam is divided-up in a first sub-beam and a second sub-beam, wherein the respective first or second image of the objects which is formed of the at least one of the first partial beam and the second partial beam is a double image comprising a first part image formed of the first sub-beam and the second part image formed of the second sub-beam. The first part image and the second part image are then arranged at a second lateral offset in such a way that the maximum FWHM zones of the PSFs of any one particular point of the objects in the first and second images and in the first and second part images will at least not fully and preferably not at all overlap. The second lateral offset may be an offset in the same direction as the first lateral offset, or it may be an offset in another direction at an angle or orthogonal to the direction of the first lateral offset.

For example, third and fourth components of the light of the at least one of the first and second partial beams divided-up in the first and second sub-beams may differ in their wavelength ranges. Thus, each point of the objects may be imaged in one spot in the first image, wherein the position of the spot on the image sensor only depends on the position of the respective point of the object, whereas this particular point of the objects may either be imaged into the first part image or the second part image of the second image depending on the wavelength of the light emitted by the respective object. Then the distance of this second image spot to the first image spot and/or the orientation of a difference vector of these image spots encodes the information on the wavelength of the light emitted.

In an even more particular embodiment of the method according to the present invention, at least one PSF in imaging any one particular point of the objects in the first image or the second image or the first part image or the second part image is expanded in a lateral direction in that the light of the respective beam is deviated in the lateral direction depending on its wavelength. Alternatively, the at least one PSF in imaging any one particular point of the objects in the first image or the second image or the first part image or the second part image may be shifted with time in a lateral direction in that the light of the respective beam is deviated in the lateral direction depending on its time of incidence. The respective lateral direction may be the direction of the first lateral offset or the second lateral offset or it may be arranged at an angle thereto.

It is to be understood that, with an expanded PSF, the maximum FWHM of the PSF is the maximum FWHM of the expanded PSF. The relative position of an image spot in the lateral direction as compared to the position of the image spot in one of the simultaneously imaged images encodes the wavelength of the incoming light. Alternatively, the position in the lateral direction may encode the time of incidence of the incoming light and thus a relative lifetime of a fluorescent state of the respective light emitting object. In a combined embodiment, the relative position in two different lateral directions may both encode the wavelength and the corresponding lifetime of the fluorescent state of the light emitting object.

Further, e.g. alternatively or additionally, a shape, an orientation or lateral position of at least one of the PSFs imaging any one particular point of the objects in the first image or the second image or the first part image or the second part image may vary with the z-position of the respective point of the objects. Then, the shape, orientation or lateral position encodes this z-position.

As already mentioned, the use according to the present invention may be applied in SMLM, i.e. with light emitting objects or sparse subsets of light emitting objects in which the individual light emitting objects are arranged at such distances that all image spots on the image sensor are well separated. Preferably, however, a series of images are recorded with the image sensor and evaluated according to a SOFI method. This will allow for a much higher density of the light emitting objects. This density, however, may have to be slightly lower than with standard SOFI methods in which each point of the objects is only imaged into one image spot on the image sensor.

Particularly, the method of the present invention may be applied in combination with all known SOFI methods.

An optical module according to the present invention for imaging light emitting objects on an image sensor comprises a polarizing beam splitter (PBS) having an entrance face, an exit face, a first return face and a second return face. A first reflector faces the first return face. A first achromatic quarter-wave retardation plate is arranged between the first return face and the first reflector. A second reflector faces the second return face, and a second achromatic quarter-wave retardation plate is arranged between the second return face and the second reflector. The first and second reflectors differ in at least one of their orientation with regard to the first and second return faces or their spectral properties.

In implementing the method according to the present invention, such an optical module according to the present invention may be arranged between a microscope objective and an image sensor of a widefield fluorescence light microscope. The module may preferably be arranged in the infinity space of the respective module. However, it may also be arranged between a tube lens and the image sensor of the respective microscope, because the numerical aperture (NA) of the converging beams is small in microscopes (NA<0.03) so that the light coming from the objective is still approximately collimated behind the tube lens.

If the first and second reflectors differ in their orientation, the first reflector may have a first plane mirror surface and the second reflector may have a second plane mirror surface, wherein the first plane mirror surface is oriented at an offset angle to a plane conjugated to the second plane mirror surface. This offset angle is in a typical range from $1\lambda/MD$ to $10\lambda/MD$. Here, $\lambda$ is a design wavelength of the optical module and MD is a minimum diameter of the entrance and exit faces of the PBS. This design wavelength and the minimum diameter of the entrance and exit faces will typically be the wavelength and a maximum diameter of a beam of the light coming from the objects. This means that the suitable offset angle depends on the wavelength and the diameter of the beam of the light coming from the objects. A preferred ratio of these values is in a range from $2\lambda/MD$ to $5\lambda/MD$ to achieve separated image spots in the first and second images but nevertheless essentially overlapping first and second images on the image sensor.

In particular embodiments of the optical module according to the invention, at least one of the first reflector and the second reflector comprises at least one dichroic mirror arranged between the respective first or second achromatic quarter-wave retardation plate and the further mirror of the at least one of the first reflector and the second reflector. Here, the first reflector and the second reflector may differ in cut-off wavelengths of the dichroic mirrors. Alternatively or additionally, the at least one of the first and second reflectors may comprise at least one of a dispersive prism or a refractive grating for deviating the respective partial beam in a lateral direction depending on the wavelength of the respective partial beam. For example, the dispersive prism or the refractive grating may be a Littrow prism or grating. Additionally or alternatively, the at least first or second reflector may comprise at least one electro-optical deflector for deviating the respective partial beam depending on the time of incidence of the incoming light. These optical elements allow for observing at least one difference in the emission characteristics of at least two emitter species without dumping photons. At least one dichroic, dispersive or time-dependently deviating element is arranged in one partial beam, such that distances depending on the difference in the emission characteristics of interest are obtained from this partial beam with respect to the image of the other partial beam. Additionally or alternatively, a phase mask may encode an axial or z-position of the respective points of the objects from which the incoming light is emitted.

In the optical module according to the invention, a birefringent optical unit may be arranged in front of the entrance face of the PBS. This birefringent optical unit may comprise an achromatic quarter-wave retardation plate and/or a Wollaston prism. The quarter-wave retardation plate may be used to circularly polarize the incident light so that the PBS of the optical module will split off the first and second partial beam with equal intensities. A Wollaston prism may be used to additionally split up the incident light to provide a higher number or twice as many of partial beams. Such a Wollaston prism provides polarization sensitivity to the optical module in which the polarization is generally erased by the quarter-wave plate in front of the entrance face.

The PBS of the optical module according to the invention may particularly be a PBS cube or a Foster PBS.

In any case, the optical module may be a monolithic unit in which all optical elements are fixed to each other by, for example, cementing them together. Here, at least one transparent optical wedge may be arranged between one mirror of one of the first reflector and the second reflector and the respective first or second return face of the PBS to orientate or arrange the mirror at a defined angle with regard to the return face.

A parallelized confocal, RESOLFT or STED scanning light microscope according to the invention comprises an excitation and an inhibition light beam path extending from a light source, through an objective and towards a sample holder, and configured to form a plurality of separate effective excitation volumes in the sample held by the sample holder, and a detection light beam path extending from the sample through the objective and up to a camera and configured to image light emitted by the sample out of the separate effective excitation volumes into separate areas of the camera. An optical module according to the invention is arranged in this detection beam path.

In a scanning light microscope according to the invention, the sample is not excited for the emission of fluorescence light in a widefield arrangement but in the plurality of separate effective excitation volumes, only. In confocal microscopy these excitation volumes are of diffraction limited size, and in STED or RESOLFT microscopy they are even smaller. Thus, each effective excitation volume is imaged in at least two separate image spots on the image sensor which do at least not fully and preferably not at all overlap with other image spots. The additional image spots encode additional information on the objects in the respective effective excitation volume. If for each of the separate effective excitation volumes a series of images are recorded with the image sensor and evaluated according to a SOFI method, the additional information extractable from the additional image spots may be maximized.

The present invention thus discloses a method and an optical module to encode color and/or polarization information of fluorophores in their lateral PSF shapes or PSF positions. This information can be retrieved from the intensity fluctuations of said fluorophores in a recorded image series according to a SOFI method. The analysis by means of spatial-temporal cumulants in SOFI is, for example, described in detail in EP 2 438 555 B1, and an enhanced cumulant analysis is described in U.S. Pat. No. 9,658,442 B2.

The present invention inter alia offers the following advantages:

A dense encoding of information. The images of different stochastically blinking fluorophores may partially or fully overlap during the imaging without inhibiting the retrieval of the encoded information.

The images are recorded with a single image sensor acting as a field stop.

The image sensor records the series of overlapping images each within a single frame.

The optical module according to the invention has a single entry face accepting collimated and approximately collimated beams and a single exit face delivering several collimated or approximately collimated beams per input beam. The exit beams are delivered under distinct mutual angles that encode the information.

Various embodiments of the optical module may be assembled into compact solid bodies which are immune to environmental and mechanical influences.

The invention allows for encoding color and/or polarization information in combination with an extended axial position information, for instance an astigmatic or double-helix encoding of the axial fluorophore position.

Figure 1:
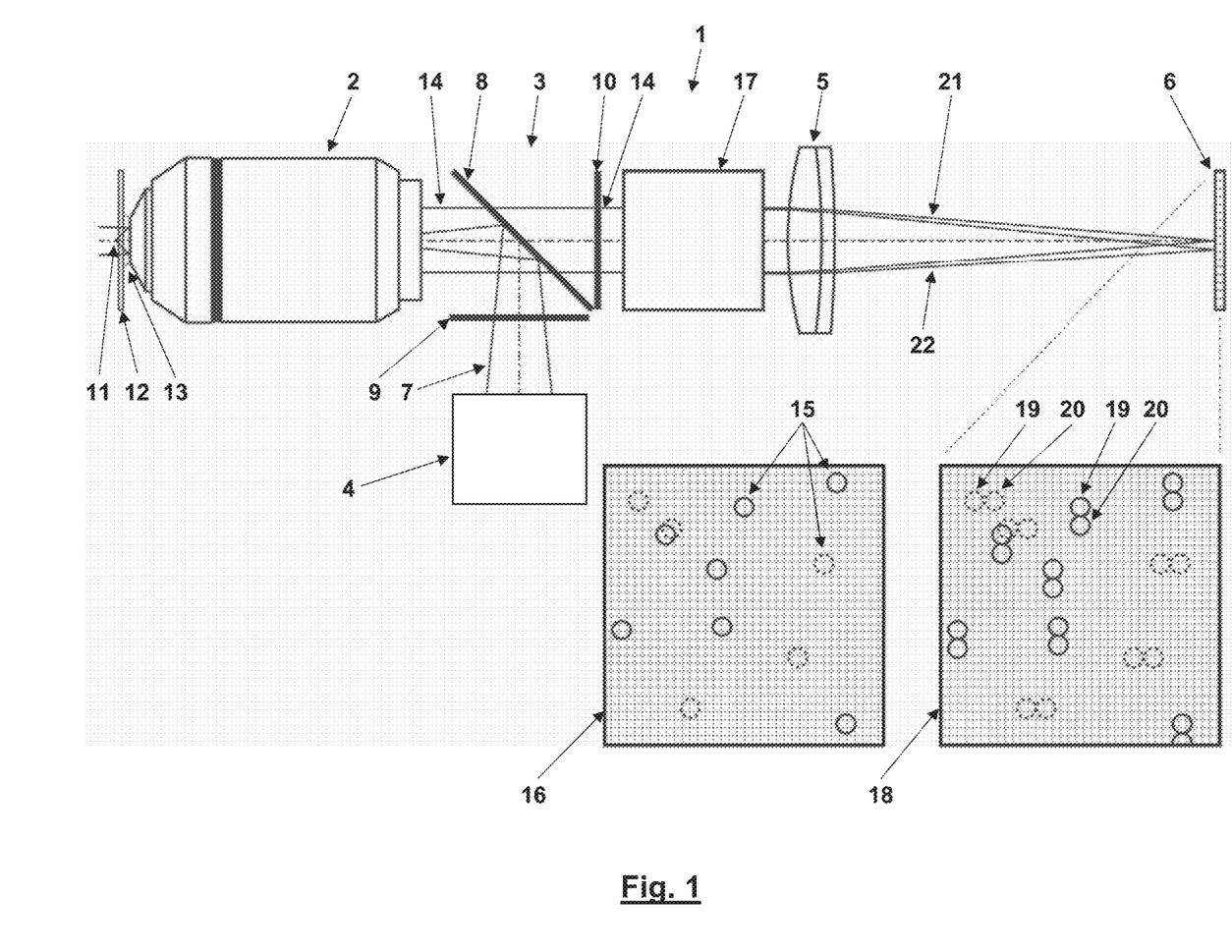
FIG. 1 illustrates the application of the general concept of the present invention in a widefield fluorescence light microscope.

Now referring in greater detail to the drawings, FIG. 1 illustrates a widefield fluorescence microscope 1. The microscope 1 comprises an objective 2, a dichroic filter set 3, a light source 4, a tube lens 5 and an image sensor 6. The light source 4 provides fluorescence excitation light 7 which is coupled into the objective 2 by the dichroic filter set 3 consisting of a dichroic mirror 8 and wavelength filters 9 and 10. The objective 2 illuminates a sample 11 which is attached to a backside of a sample carrier glass 12 with the fluorescence excitation light 7 through an immersion medium 13. Thus, the objective 2 is an immersion objective, here. Due to the excitation by the fluorescence excitation light 7 fluorescent objects in the sample 11 emit fluorescence light 14. This fluorescence light 14 is separated by the dichroic filter set 3 from the fluorescence excitation light 7 and focused by the tube lens 5 on the image sensor 6. Thus, each light emitting object in the sample 11 results in an image spot 15 in an image 16 formed on the image sensor 6. The position of the respective image spot 15 corresponds to the lateral position of the respective object in the sample 11. Thus, the lateral position of the respective object can be retrieved from the position of the associated image spot 15 in the image 16.

Up to here, the microscope 11 and its function have been described considering neither an optical module 17 which is arranged between the dichroic filter set 3 and the tube lens 5 nor the effect of this optical module 17. The optical module 17 encodes color and/or polarization information included in the fluorescence light 14 in overlapping images 18 on the image sensor 6 in which each of the light emitting objects in the sample 11 is represented by a first image spot 19 and a second image spot 20. In the overlapping images 18, the first image spots 19 may be arranged at the same positions as the image spots 15 in the image 16. The second image spots 20 are arranged at lateral offsets to the first image spots 19, and the directions of the lateral offsets depend on a wavelength of the light emitted by the respective object. For example, the wavelength of the light emitted by those objects, whose image spots are surrounded by a continuous line may have a first wavelength, and the light emitted by the objects whose image spots are enclosed by a dashed line may have a second wavelength differing from the first wavelength. Thus, both the positions and the wavelengths of the light emitted by the objects can be retrieved from the overlapping images 18.

In the images 16 and 18 depicted in FIG. 1, the image spots 15, 19 and 20 correspond to the areas of the respective point spread function (PSF) encircled by their full widths at half maximum (FWMHs). Even in the overlapping images 18 depicted in FIG. 1, the image spots 19 and 20 of most of the different light emitting objects in the sample 11 do not overlap. Thus, the information encoded in the overlapping images 18 may be retrieved by single molecule localization microscopy (SMLM) analysis. With a higher density of the light emitting objects—so that the image spots 19 and 20 of different light emitting objects in the sample 11 do overlap—the information both on the location of the objects and the wavelengths of the light emitted by the objects can still be retrieved by the application of super-resolution optical fluctuation imaging (SOFI). For example, a horizontal or vertical cross-cumulant of the overlapping images 18 reports on correlated intensity fluctuations of the horizontal or vertical double image spots 19, 20, respectively. The cumulants calculated from several pixels in the horizontal double image spots 19, 20 depicted with dashed lines, including at least one pixel each in the left image spot 19 and the right image spot 20, report on the position and emission in one color channel, whereas the cumulants calculated from several pixels in the vertical double image spots 19, 20, depicted with continuous lines, including at least one pixel each in the top image spot 19 and the bottom image spot 20, report on the position and emission in another color channel.

To achieve this function, the optical module 17 splits the incoming fluorescence light 14 into two partial beams 21 and 22, which are focused in the image spots 19 and 20 of the overlapping images 18, respectively. Each of the overlapping images 18 is formed on the image sensor 6 at a same magnification and in a same orientation but at the lateral offset between the image spots 19 and 20. To achieve the overlapping images 18 depicted in FIG. 1, the optical module 17 will split up the incoming light 14 into three partial beams, wherein one partial beam comprises light of both wavelengths indicated by the dashed lines and the continuous lines, whereas the two other partial beams only comprise light indicated by either the dashed lines or the continuous lines. These two other partial beams are formed in a second image at the lateral offset in horizontal direction and in a third image at the lateral offset in vertical direction, respectively.

Figure 2:
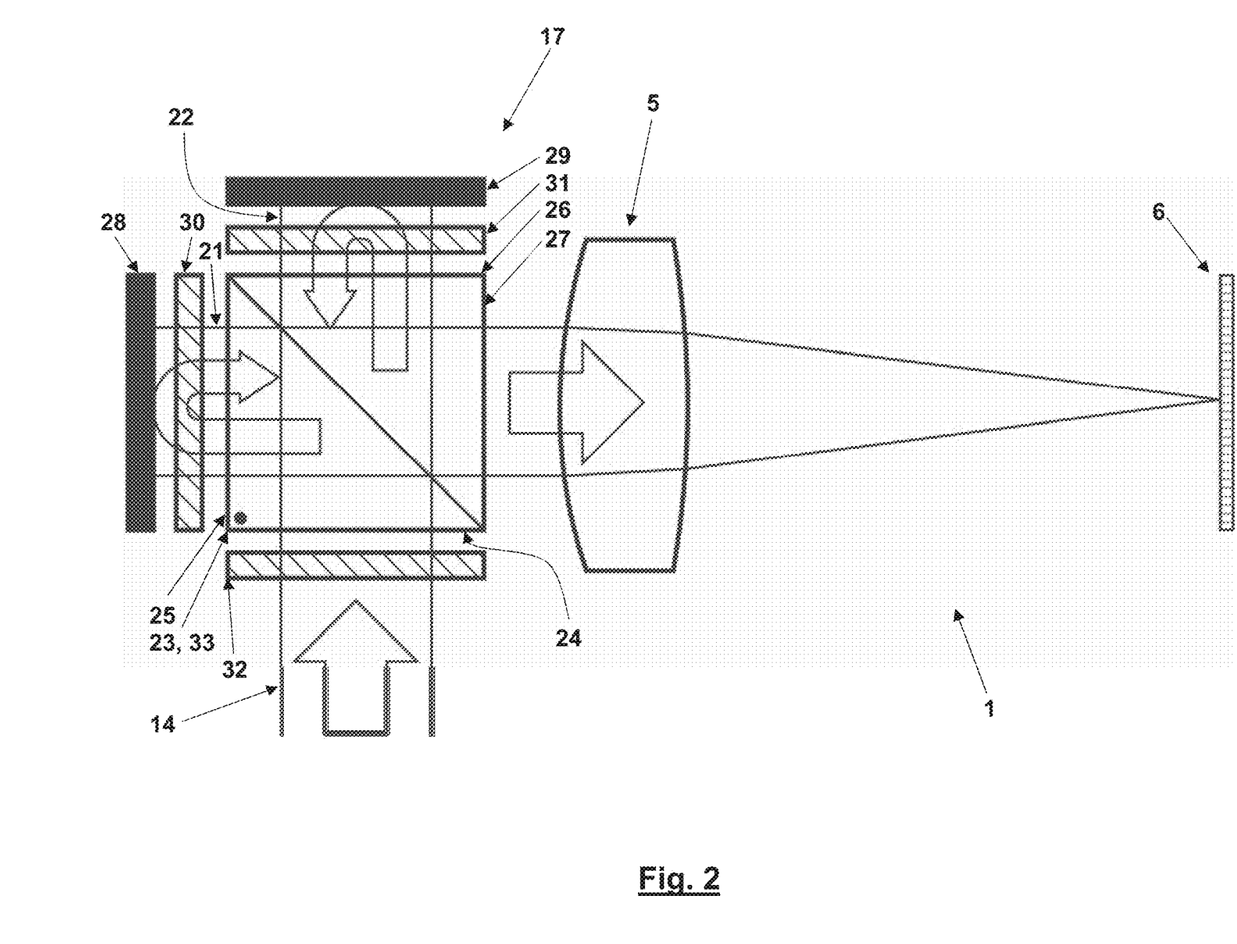
FIG. 2 illustrates a detail of a more particular embodiment of the fluorescence light microscope according to FIG. 1 including a first embodiment of the optical module according to the present invention.

FIG. 2 outlines the optical module 17, the tube lens 5 and the image sensor 6 of a more detailed embodiment of the fluorescence light microscope 1 according to FIG. 1. In this embodiment, the optical module 17 changes the direction of the incoming fluorescence light 14 by 90°, and the optical module is depicted in a basic version without indicating any differences between the partial beams 21 and 22 of FIG. 1. A polarizing beam splitter (PBS) 23 serves as a two-way bidirectional 50:50 beam splitter and beam combiner. The PBS 23 comprises an entrance face 24, a first return face 25, a second return face 26 and an exit face 27 facing the tube lens 5. A first reflector 28 faces the first return face 25, and a second reflector 29 faces the second return face 26. A first achromatic quarter-wave retardation plate 30 is arranged between the first return face 25 and the first reflector 28, and a second achromatic quarter-wave retardation plate 31 is arranged between the second return face 26 and the second reflector 29. A further achromatic quarter-wave retardation plate 32 is arranged in front of the entrance face 24. This quarter-wave retardation plate 31 circularly polarizes incoming linearly polarized fluorescence light 14 so that the PBS splits up the incoming fluorescence light 14 in the first partial beam 21 and the second partial beam 22 at equal intensities. The first partial beam 21 exits the PBS 23 through the first return face 25, and it is reflected back into the PBS 23 by the reflector 28. Before getting back into the PBS 23, the polarization of the first partial beam 21 has been turned by 90° due to twice passing through the first quarter-wave retardation plate 30 so that the first partial beam 21 which was at first deflected by the PBS 23 is now transmitted by the PBS 23 through the exit face 27 towards the tube lens 5. Similarly, the second partial beam 22 which is at first transmitted by the PBS 23 through the first return face 26 is reflected by the second reflector 29, whereas its polarization is turned by 90° due to twice passing through the second quarter-wave retardation plate 31, and then deflected by the PBS 23 through the exit face 27 towards the tube lens 5. If the first and second deflectors 28 and 29 slightly differ in their orientation with regard to the first and second return faces 25 and 26 respectively, the two partial beams 21 and 22 display an offset angle behind the exit surface 27. This offset angle is selected such that the lateral offset between the PSFs for the first partial beam 21 and the second partial beam 22 are laterally offset on the image sensor 6 by about 200% to 500% of a maximum of their full widths at half maximum (FWHMs) in direction of this lateral offset so that the image spots 19 and 20 according to FIG. 1 do not overlap. If the first and second deflectors 28 and 29 further differ in their spectral properties so that the partial beams 21 and 22 will also differ with regard to their wavelength compositions, the optical module 17 encodes wavelength or color information, for example.

The construction of the optical module 17 according to FIG. 2 ensures that path lengths of the partial beams 21 and 22 up to the tube lens 5 are essentially equal. Further, their wavefronts reaching the tube lens 5 are essentially equal except for the introduced tilt that laterally shifts the overlapping images on the image sensor 6 with regard to each other. Further, the partial beams 21 and 22 are both reflected once and transmitted once at the polarizing interface of the PBS 23, reflected once by the reflectors 28 and 29 and encounter an equivalent sequence of optical interfaces and elements. The PBS 23, which is a cube PBS 33 here, may be made of two optically contacted right-angle prisms, the optical contact avoiding stray light from an optical adhesive.

Figure 3:
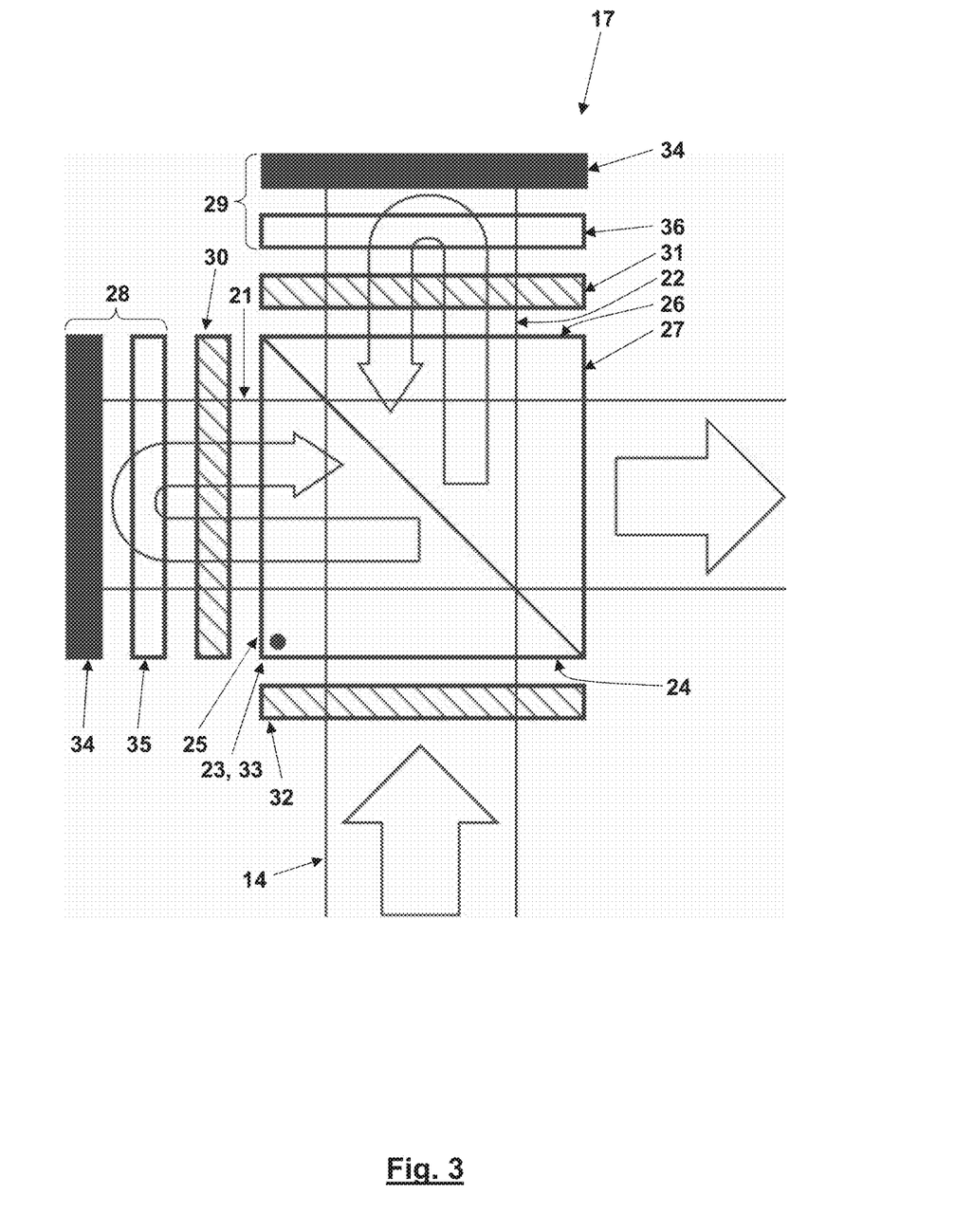
FIG. 3 illustrates a second embodiment of the optical module according to the present invention.

In the embodiment of the optical module 17 separately depicted in FIG. 3, the reflectors 28 and 29 are both made of a plane mirror 34 and a dichroic mirror 35 and 36, respectively. If the dichroic mirrors 35 and 36 differ in their cut-off wavelengths and are tilted about axes running parallel and at a right angle to the drawing plane of FIG. 3, respectively, the optical module 17 encodes the color information as depicted in FIG. 1. The tilted dichroic mirror 35 deflects light of one wavelength in the vertical direction, whereas the tilted dichroic mirror 36 deflects light of another wavelength in the horizontal direction. The remaining light of the first partial beam 21 and the second partial beam 22 is reflected by the plane mirrors 34 without deflection so that these components of the first partial beam 21 and the second partial beam 22 are merged when passing through the PBS 23 for a second time. Thus, a total of three partial beams of three slightly differing directions exit the optical module through the exit face 27. The relative intensities of the fluorescence light 14 in at least two of the three image spots into which these three partial beams are focused on the image sensor 6 for each particular point of the objects the sample 11, or respective cross-cumulants, may be evaluated such as to increase the number of the effective color channels of the fluorescence microscope 1 beyond those two color channels defined by the cut-off wavelengths of the dichroic mirrors 35 and 36.

Figure 4:
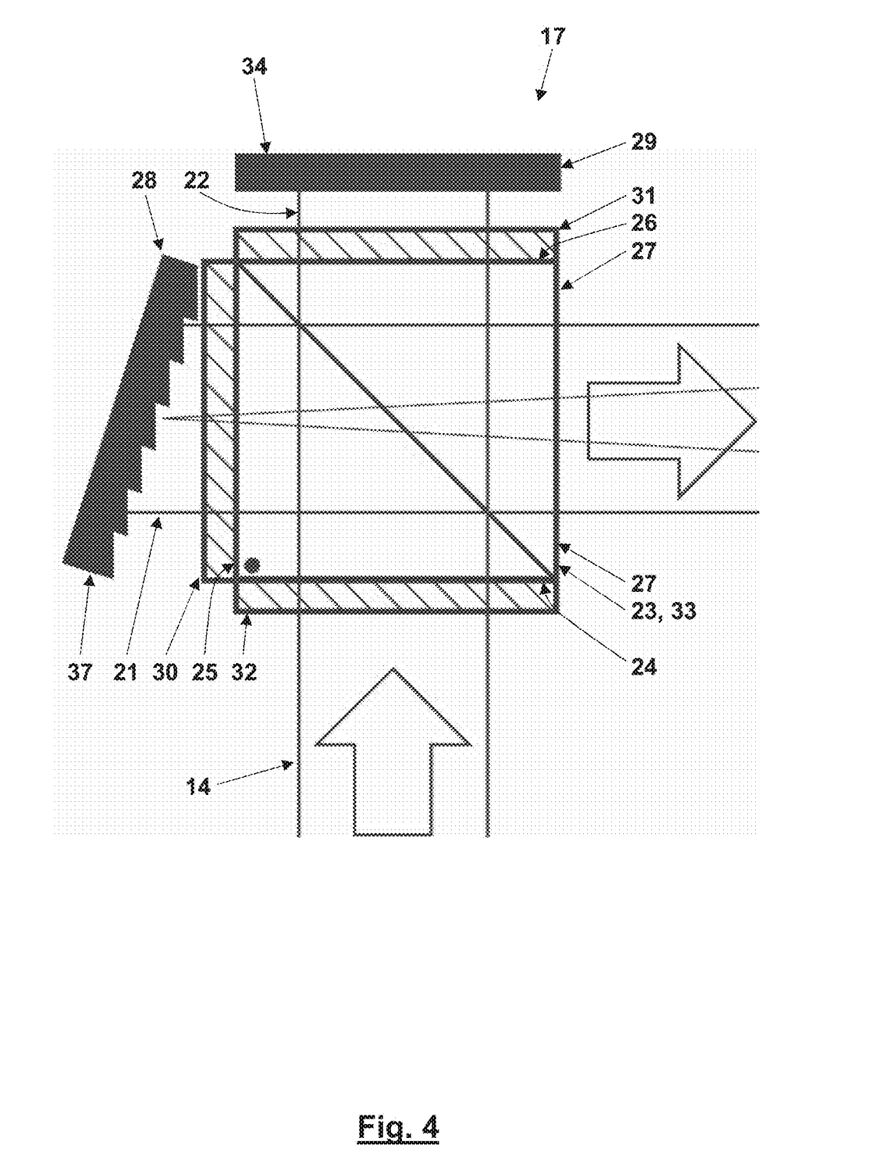
FIG. 4 illustrates a third embodiment of the optical module according to the present invention.

In the optical module 17 according to FIG. 4, the first deflector 28 is made as a Littrow grating 37, whereas the second reflector 29 is a plane mirror 34. The Littrow grating 37 deflects the first partial beam 21 in the drawing plane of FIG. 4 depending on the wavelength of the light of the partial beam 21. In the embodiment of the optical module 17 depicted in FIG. 5, a similar functionality is achieved by a Littrow prism 38 instead of the Littrow grating 37 in the first reflector 28.

Figure 5:
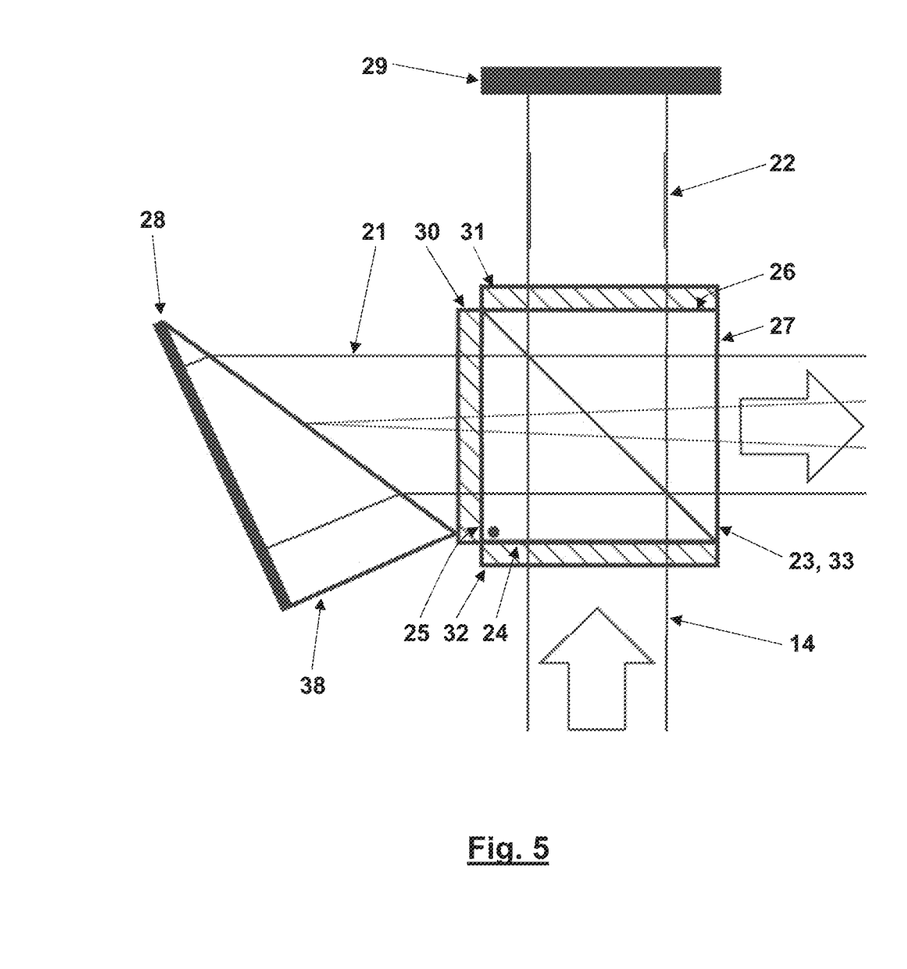
FIG. 5 illustrates a fourth embodiment of the optical module according to the present invention.
Figure 6A:
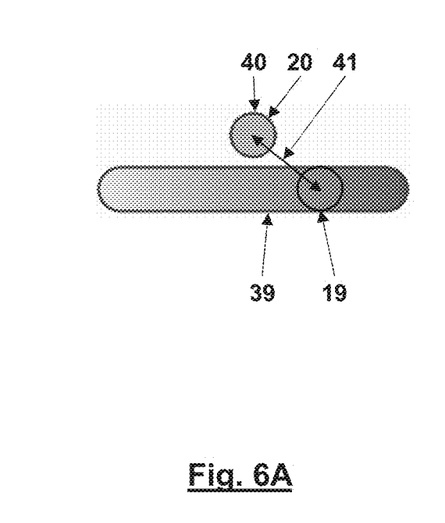
FIGS. 6A-6C illustrate first and second PSFs of different embodiments of the present invention.

FIG. 6A shows a first PSF 39 of the first partial beam 21 if the fluorescence light microscope 1 of FIG. 1 comprises the optical module of FIG. 4 or 5. The PSF 39 depicted up to its FWHM is expanded in a lateral direction because the light of the first partial beam 21 is deviated in this lateral direction by the Littrow grating 37 or the Litterow prism 38 depending on its wavelength. A point shaped object emitting monochromatic light will, however, only be imaged in a circular image spot 19 somewhere along the laterally expanded PSF 39. Further, FIG. 6A depicts a second PSF 40 of the second partial beam 22 which is not deviated depending on its wavelength. Thus, the image spot 20 coincides with the PSF 40 independently of its wavelength. In this way, the wavelength of the light emitted by each light emitting object is encoded in a lateral offset 41 between the image spots 19 and 20, i.e. in a length and an orientation of this lateral offset 41.

Figure 6B:
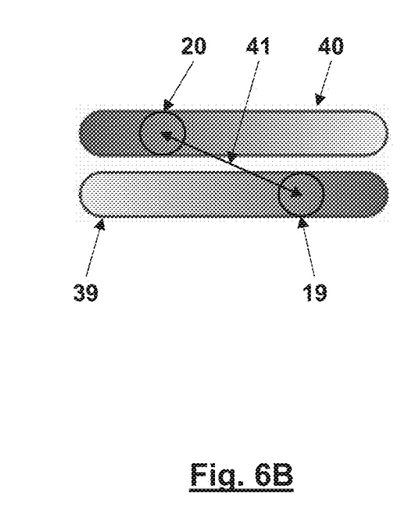

According to FIG. 6B both the first PSF 39 and the second PSF 40 are expanded in a lateral direction in that both the first partial beam 21 and the second partial beam 22 are deviated in the respective lateral direction depending on their wavelengths. The directions of these expansions are parallel to each other but with opposite spectral separation. In this way, the spectral sensitivity is increased as indicated by the two image spots 19 and 20 in which a light emitting object emitting light of the same wavelength as in FIG. 6A is imaged. The lateral offset 41 between these two image spots 19 and 20 is much larger than in FIG. 6A, and the bandwidth of possible orientations of this lateral offset 41 is also increased. Whereas the image spot 20 may mark the real position of the respective light emitting object in FIG. 6A, this real position is encoded in the center of intensity of the two image spots 19 and 20 in FIG. 6B.

Figure 6C:
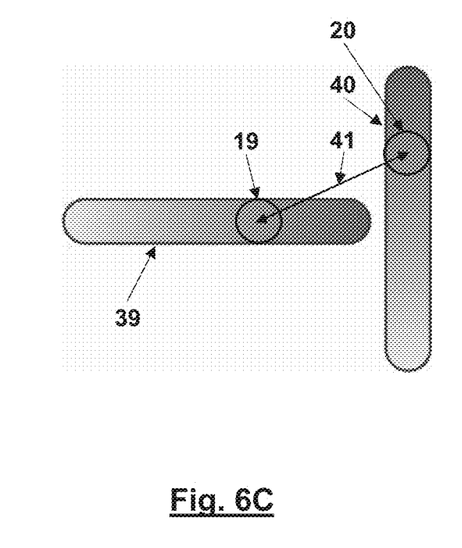

According to FIG. 6C the directions of the expansion of the first and second point PSFs 39 and 40 are orthogonal to each other. The first and second PSFs 39 and 40 may even overlap here as long as the two image spots 19 and 20 of any point shaped object emitting light of a single wavelength will be imaged in two separable image spots 19 and 20 which do essentially not overlap.

Figure 7:
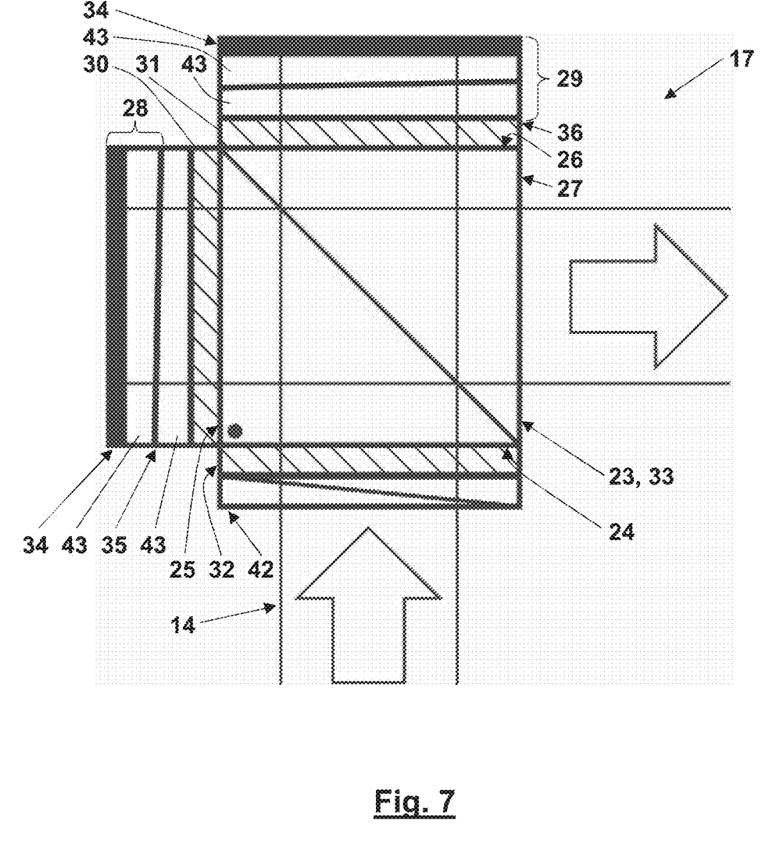
FIG. 7 illustrates a first monolithic embodiment of the optical module according to the present invention.

In the optical element 17 according to FIG. 7, a Wollaston prism 42 is arranged in front of the quarter-wave retardation plate 32 which is arranged in front of the entrance face 24 of the PBS 23. The Wollaston prism 42 separates randomly polarized light into linearly, orthogonally polarized fractions that exit the Wollaston prism 42 at an offset angle defined by the Wollaston prism. Hence, the Wollaston prism 42 is used for creating two laterally shifted image copies corresponding to the two linearly polarized components. If other polarization states shall be sensed, birefringent wave retardation plates and/or other polarization manipulating elements may be used to transform these polarization states into the two orthogonal linear polarizations that are split by the Wollaston prism 42. For instance, left-and-right-handed circularly polarized light may be split by placing a quarter-wave retardation plate in front of the Wollaston prism 42, the major axes of this quarter-wave retardation plate being orientated at 45° with respect to the major polarization axis of the Wollaston prism 42. Further, both the first and second reflectors 28 and 29 of the optical module 17 according to FIG. 7 comprise a plane mirror 34 and a first and second dichroic mirror 35 and 36, respectively, which is tilted with regard to the plane mirror 34 and the first return face and the second return face 26, respectively. The wavelength or color may only be encoded with the dichroic mirrors 35 and 36 after the polarization is encoded with the Wollaston prism 42 as the wavelength or color encoding destroys the polarization information. Further, FIG. 7 shows that all optical elements of the optical module 17 are cemented or affixed into a single solid body. For this purpose, the dichroic mirrors 35 and 36 are formed on the surfaces of precision glass wedges 43.

Figure 8:
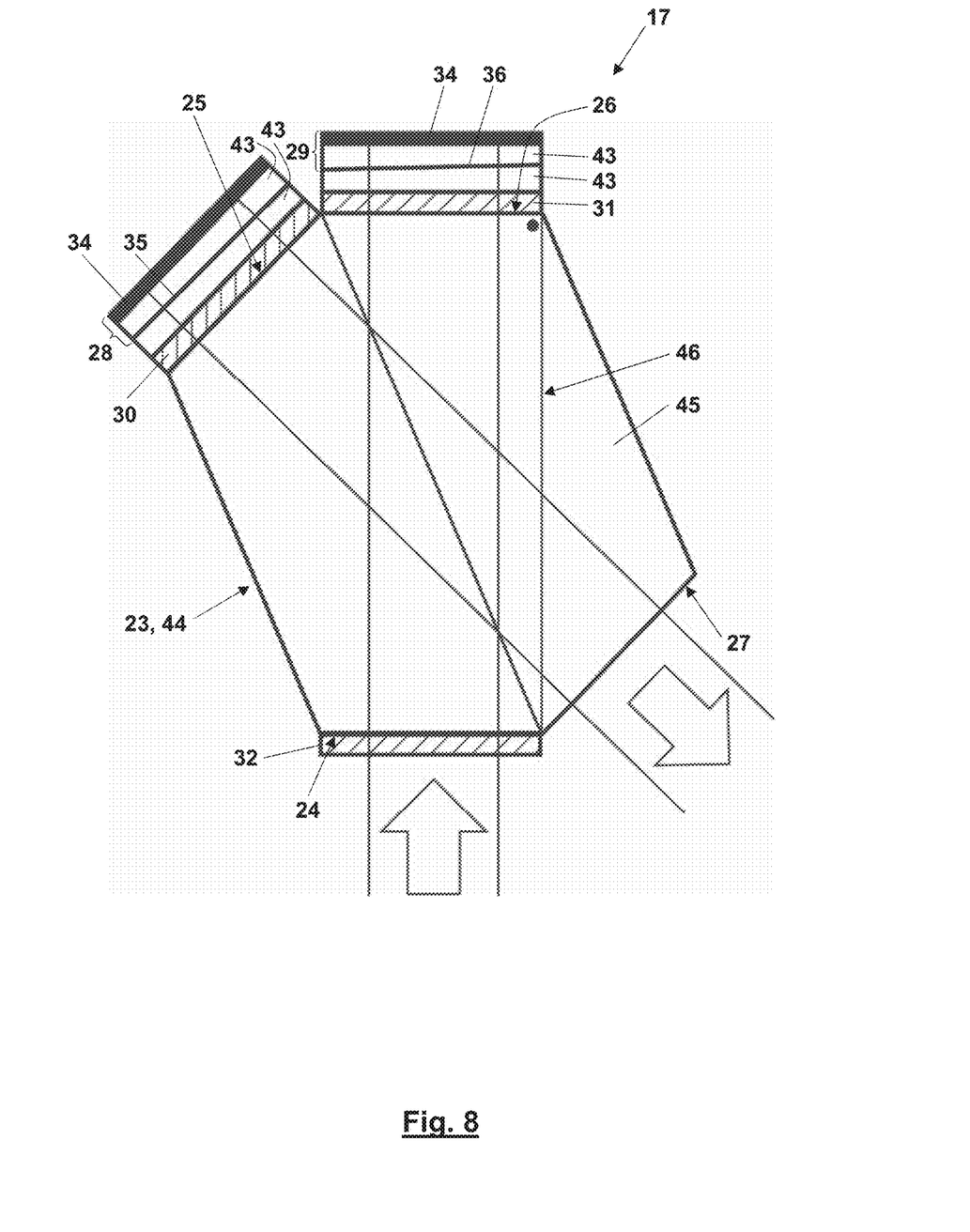
FIG. 8 illustrates a second monolithic embodiment of the optical module according to the present invention.

FIG. 8 depicts an embodiment of the optical module 17 in which the PBS 23 is a Foster PBS 44. The deflectors 28 and 29 of this optical module 17 are designed in a same way as the reflectors 28 and 29 of FIG. 7, and all optical elements are also cemented or affixed into a single solid body. The Foster PBS 44 avoids absorptive losses. However, it is quite expensive and its design approximately doubles the optical path lengths within the PBS 23. The Foster PBS 44 depicted in FIG. 8 differs from a commercial Foster PBS by the additional volume 45 beyond a plane 46 towards the exit face 27. This additional volume 45 makes the Foster PBS 44 symmetric and bidirectional.

Alternatively or additionally one of the reflectors 28 and 29 may also be provided with a phase mask encoding an axial or z-position of the light emitting objects in the shape, orientation or lateral position of the first or second PSF. Further, an electro-optical deflector in one of the first and second reflectors 28 and 29 may be used to deviate the first or second partial beam 21, 22 in a lateral direction depending on its time of incidence to encode a lifetime of a fluorescent state of the light emitting object, for example.

The optical module 17 may not only be integrated into widefield fluorescence light microscopes but also into parallelized confocal, resolved or STED scanning light microscopes. In this case, the individual separate effective excitation volumes in which a respective sample is effectively excited for fluorescence are each imaged in at least two image spots 19 and 20 which are separated from each other and from the image spots of all other separate effective excitation volumes.

Many variations and modifications may be made to the preferred embodiments of the invention without departing substantially from the spirit and principles of the invention. All such modifications and variations are intended to be included herein within the scope of the present invention, as defined by the following claims.

We claim:

1. An optical module for imaging light emitting objects on an image sensor, the optical module comprising:
    a polarizing beam splitter (PBS) having an entrance face, an exit face, a first return face and a second return face,
    a first reflector facing the first return face,
    a first achromatic quarter-wave retardation plate arranged between the first return face and the first reflector,
    a second reflector facing the second return face, and
    a second achromatic quarter-wave retardation plate arranged between the second return face and the second reflector,
    wherein the first reflector and the second reflector differ in at least one of their orientation with regard to the first and second return faces or their spectral properties, wherein at least one of the first reflector and the second reflector comprises at least one of
        at least one dichroic mirror arranged between the respective first or second achromatic quarter-wave retardation plate and a further mirror of the at least one of the first reflector and the second reflector, wherein the at least one dichroic mirror is tilted with regard to the further mirror of the at least one of the first reflector and the second reflector,
        a dispersive prism,
        a diffractive grating,
        an electro optical deflector, and
        a phase mask.

2. The optical module of claim 1, wherein the first reflector has a first plane mirror surface and the second reflector has a second plane mirror surface, wherein the first plane mirror surface is oriented at an offset angle to a plane conjugated to the second plane mirror surface, wherein the offset angle is in a range from 2/MD to 5/MD, wherein is a design wavelength of the optical module and MD is a minimum diameter of the entrance and exit faces.

3. The optical module of claim 1, wherein the first reflector comprises a first dichroic mirror of a first cutoff wavelength and the second reflector comprises a second dichroic mirror of a second cutoff wavelength different to the first cutoff wavelength of the first dichroic mirrors.

4. The optical module of claim 1, wherein the at least one of the dispersive prism and the diffractive grating is a Littrow prism or a Littrow grating.

5. The optical module of claim 1, wherein a birefringent optical unit comprising at least one of an achromatic quarter-wave retardation plate and a Wollaston prism is arranged in front of the entrance face.

6. The optical module of claim 1, wherein the polarizing beam splitter is a PBS cube or a Foster PBS.

7. The optical module of claim 1, wherein the optical module is a monolithic unit in which all optical elements are fixed to each other.

8. The optical module of claim 7, wherein at least one transparent optical wedge is arranged between one mirror of one of the first reflector and the second reflector and the respective first or second return face of the PBS.

9. A parallelized confocal, RESOLFT or STED scanning light microscope comprising
    a light source,
    an objective,
    a sample holder,
    an image sensor,
    an excitation light beam path extending from the light source, through the objective and towards the sample holder, and configured to form a plurality of separate effective excitation volumes in a sample held by the sample holder,
    a detection light beam path extending from the sample, through the objective and up to an image sensor, and configured to image light emitted by the sample out of the separate effective excitation volumes into separate areas of the image sensor, and
    the optical module of claim 1 arranged in the detection beam path.

10. A method of imaging light emitting objects on an image sensor of a widefield fluorescence light microscope, the method comprising, arranging an optical module between a microscope objective and the image sensor of the widefield fluorescence light microscope, the optical module comprising:
  a polarizing beam splitter (PBS) having an entrance face, an exit face, a first return face and a second return face,
  a first reflector facing the first return face,
  a first achromatic quarter-wave retardation plate arranged between the first return face and the first reflector,
  a second reflector facing the second return face, and
  a second achromatic quarter-wave retardation plate arranged between the second return face and the second reflector,
  wherein the first reflector and the second reflector differ in at least one of their orientation with regard to the first and second return faces or their spectral properties, wherein at least one of the first reflector and the second reflector comprises at least one of
    at least one dichroic mirror arranged between the respective first or second achromatic quarter-wave retardation plate and a further mirror of the at least one of the first reflector and the second reflector, wherein the at least one dichroic mirror is tilted with regard to the further mirror of the at least one of the first reflector and the second reflector,
    a dispersive prism,
    a diffractive grating,
    an electro optical deflector, and
    a phase mask,
using the optical module for splitting a first partial beam and a second partial beam off light coming from the objects,
using the optical module for simultaneously forming, on the same image sensor, at a same magnification, and in a same orientation, a first image and a second image of the objects of the first partial beam and of the second partial beam, respectively, and for arranging the first image and the second image on the image sensor at a first lateral offset,
wherein the first image and the second image of the objects overlap by more than 50% of their areas on the image sensor, and
wherein the first lateral offset is at least 20% of a maximum full width at half maximum (FWHM) in direction of the first lateral offset of a first point spread function (PSF) in imaging any one particular point of the objects in the first image and of a second PSF in imaging the same one particular point of the objects in the second image.

11. The method of claim 10, wherein the first lateral offset is in a range from a minimum percentage to a maximum percentage of the maximum FWHM in direction of the first lateral offset, wherein the minimum percentage is 200% and wherein the maximum percentage is 500%.

12. The method of claim 10, further comprising
dividing-up at least one of the first partial beam and the second partial beam in a first sub-beam and a second sub-beam,
forming the respective first or second image of the objects of the at least one of the first partial beam and the second partial beam as a double image comprising a first part image formed of the first sub-beam and a second part image formed of the second sub-beam, and
arranging the first part image and the second part image at a second lateral offset in such a way that the maximum FWHMs of the PSFs of any one particular point of the objects in the first and second images and in the first and second part images will not overlap.

13. The method of claim 12, wherein third and fourth components of the light of the at least one of the first and second partial beams divided-up in the first and second sub-beams differ in their wavelength ranges.

14. The method of claim 10, wherein imaging any one particular point of the objects in the first image or the second image further comprises
expanding at least one PSF in a lateral direction in that the light of the first partial beam or the second partial beam, respectively, is deviated in the lateral direction depending on its wavelength, and
shifting at least one PSF with time in a lateral direction in that the light of the first partial beam or the second partial beam, respectively, is deviated in the lateral direction depending on its time of incidence.

15. The method of claim 10, wherein a shape, an orientation or a lateral position of at least one of the PSFs in imaging any one particular point of the objects in the first image or the second image varies with the z-position of the respective point of the objects.

16. The method of 10, further comprising
recording a series of the overlapping images with the image sensor, and
an d evaluating the recorded series of the overlapping images according to super-resolution optical fluctuation imaging (SOFI).

17. A method of imaging light emitting objects on an image sensor of a widefield fluorescence light microscope, the method comprising
splitting a first partial beam and a second partial beam off light coming from the objects,
simultaneously forming, on the same image sensor, at a same magnification, and in a same orientation, a first image and a second image of the objects of the first partial beam and of the second partial beam, respectively, and arranging the first image and the second image which are both widefield images on the image sensor at a first lateral offset, and
wherein the first image and the second image of the objects overlap by more than 50% of their areas on the image sensor,
wherein the first lateral offset is in a range from a minimum percentage to a maximum percentage of a maximum full width at half maximum (FWHM) in direction of the first lateral offset of a first point spread function (PSF) in imaging any one particular point of the objects in the first image and of a second PSF in imaging the same one particular point of the objects in the second image, wherein the minimum percentage is 100%, and
recording a series of the overlapping images with the image sensor and evaluating the recorded series of the overlapping images according to super-resolution optical fluctuation imaging (SOFI).

18. The method of claim 17, wherein the minimum percentage is 200% and wherein the maximum percentage is 500%.

19. The method of claim 17, wherein first components of the incoming light split-off in the first partial beam and second components of the incoming light split-off in the second partial beam differ in at least one of their wavelength ranges and their polarizations in the incoming light.

20. The method of claim 17, further comprising
dividing-up at least one of the first partial beam and the second partial beam is divided-up in a first sub-beam and a second sub-beam, and
forming the respective first or second image of the objects of the at least one of the first partial beam and the second partial beam as a double image comprising a first part image formed of the first sub-beam and a second part image formed of the second sub-beam, and arranging the first part image and the second part image at a second lateral offset in such a way that the maximum FWHMs of the PSFs of any one particular point of the objects in the first and second images and in the first and second part images will not overlap.

21. The method of claim 20, wherein third and fourth components of the light of the at least one of the first and second partial beams divided-up in the first and second sub-beams differ in their wavelength ranges.

22. The method of claim 17, further comprising, in imaging any one particular point of the objects in the first image or the second image, expanding at least one PSF in a lateral direction in that the light of the first partial beam or the second partial beam, respectively, is deviated in the lateral direction depending on its wavelength.

23. The method of claim 17, further comprising, in imaging any one particular point of the objects in the first image or the second image, shifting at least one PSF with time in a lateral direction in that the light of the first partial beam or the second partial beam, respectively, is deviated in the lateral direction depending on its time of incidence.

24. The method of claim 17, wherein a shape, an orientation or a lateral position of at least one of the PSFs in imaging any one particular point of the objects in the first image or the second image varies with the z-position of the respective point of the objects.

* * * * *